Jan. 5, 1926.  
D. EDGE ET AL  
1,568,140  
PRESSURE GAUGE  
Filed Sept. 28, 1923  
4 Sheets-Sheet 1

Witnesses:  
Edwin Trueb

Inventors:  
DEXTER EDGE and  
JOHN A. HUNTER,  
by D. Anthony Usina  
their Attorney.

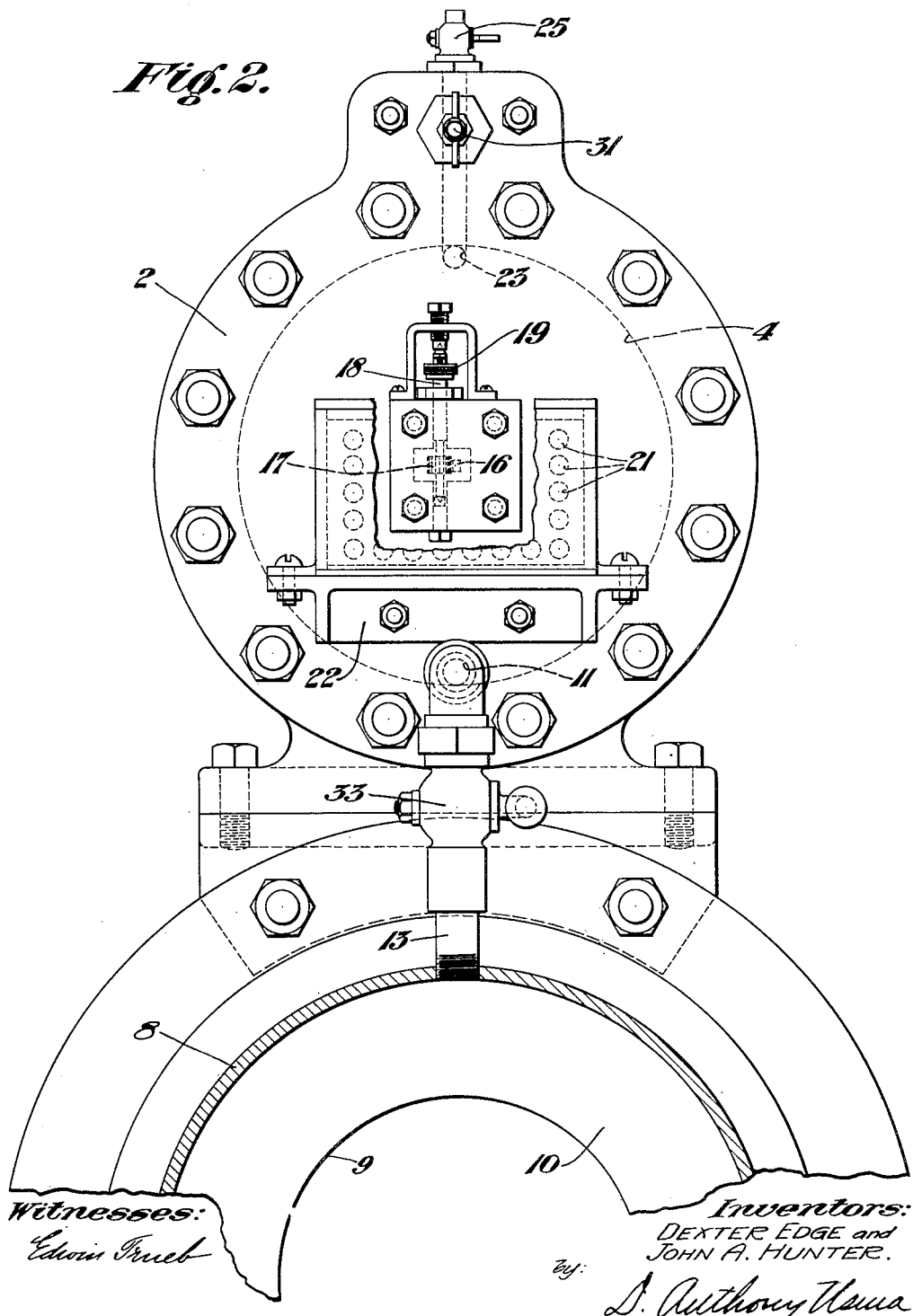

Jan. 5, 1926.　　　　　　　　　　　　　　　　　　　　1,568,140
D. EDGE ET AL
PRESSURE GAUGE
Filed Sept. 28, 1923　　　　4 Sheets-Sheet 3
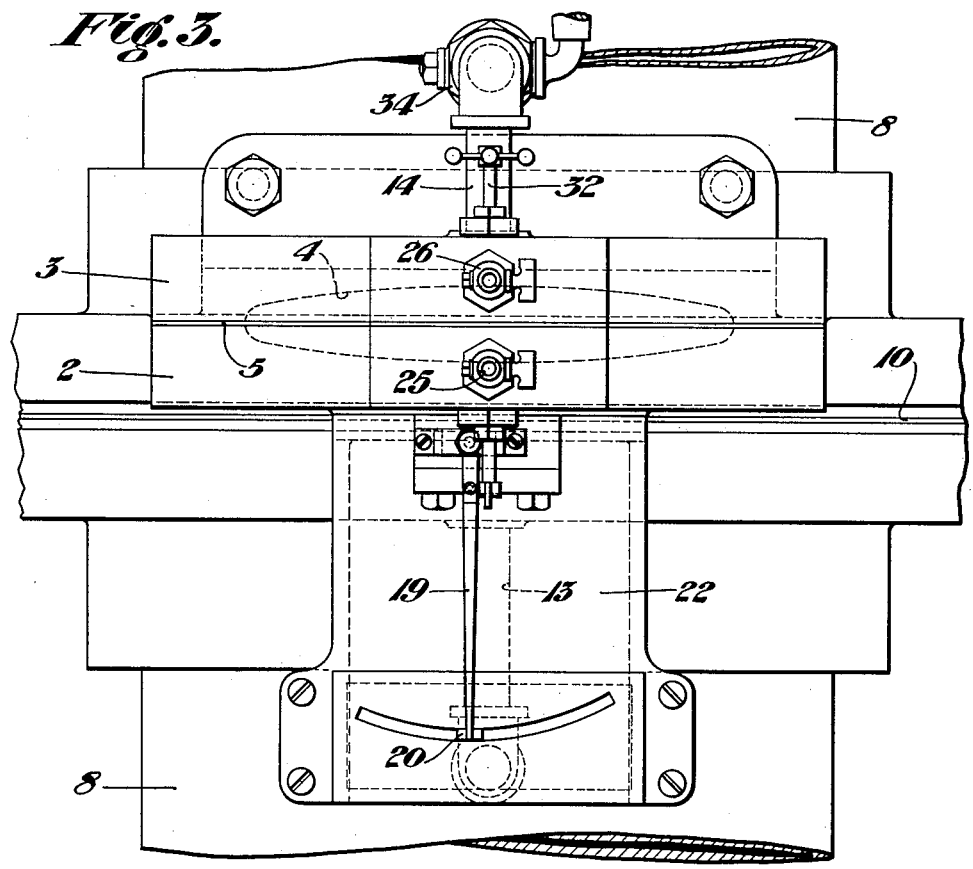
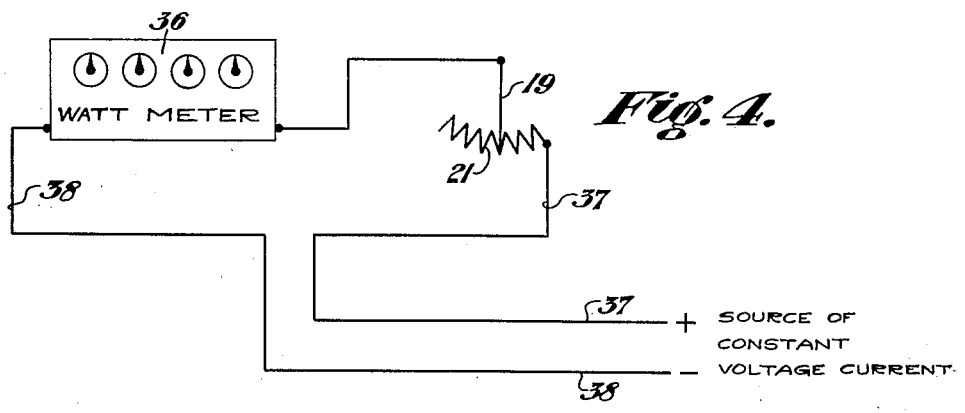
Witnesses:
Edwin Trueb
Inventors:
DEXTER EDGE and
JOHN A. HUNTER
by D. Anthony Usina
their Attorney.

Jan. 5, 1926.  1,568,140
D. EDGE ET AL
PRESSURE GAUGE
Filed Sept. 28, 1923  4 Sheets—Sheet 4

Witnesses:
Edwin Trueb

Inventors:
DEXTER EDGE and
JOHN A. HUNTER.
by D. Anthony Usina
their Attorney.

Patented Jan. 5, 1926.

1,568,140

UNITED STATES PATENT OFFICE.

DEXTER EDGE, OF PITTSBURGH, AND JOHN A. HUNTER, OF BEN AVON, PENNSYLVANIA.

PRESSURE GAUGE.

Application filed September 28, 1923. Serial No. 665,375.

*To all whom it may concern:*

Be it known that we, DEXTER EDGE and JOHN A. HUNTER, citizens of the United States, and residents, respectively, of Pittsburgh and Ben Avon, in the county of Allegheny and State of Pennsylvania, have invented certain new and useful Improvements in Pressure Gauges, of which the following is a specification.

This invention relates to pressure gauges and more particularly to pressure gauges for measuring the variations in flow of a fluid through a main or other conduit.

One object of the present invention is to provide a gauge that is especially adaptable to pulsating flow in pipe lines, such as steam to a reciprocating engine, air from a reciprocating air compressor, etc., although it is not limited to such uses but may be used equally well on a non-pulsating flow.

Another object is to provide a pressure gauge having an improved form of metallic diaphragm particularly adapted for use in gauges of this class and which will bend more uniformly over its entire surface than diaphragms such as used in the prior art.

A still further object is to provide a pressure gauge having the novel design, construction, and combination of parts hereinafter described, and illustrated in the accompanying drawings.

In the drawings—

Figure 2 is a front end elevation thereof.

Figure 3 is a top plan thereof.

Figure 4 is a wiring diagram showing the operation of the watt meter.

Figure 1:
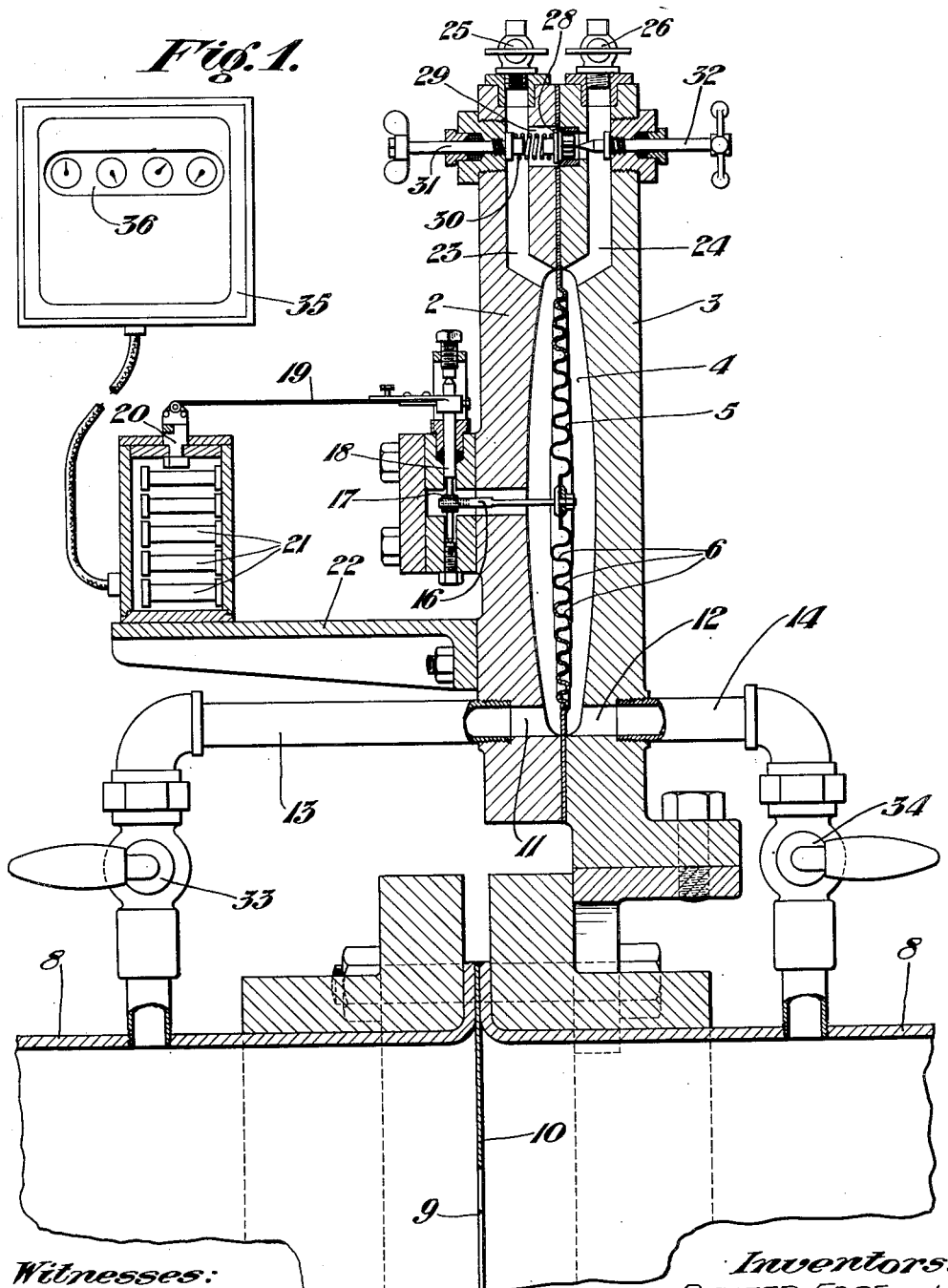
Figure 1 is a sectional elevation through a pressure gauge and main, showing the gauge in operative position.
Figure 5:
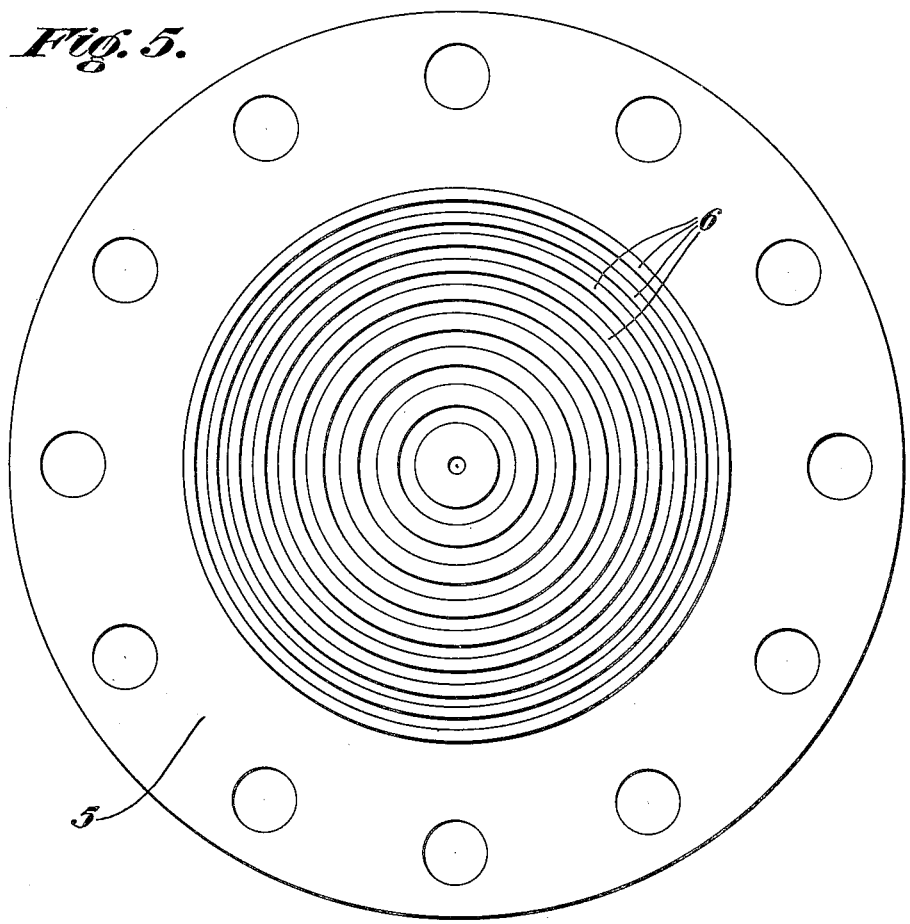
Figure 5 is a front and Figure 6 is a sectional elevation of the diaphragm used in the gauge of this application.
Figure 6:
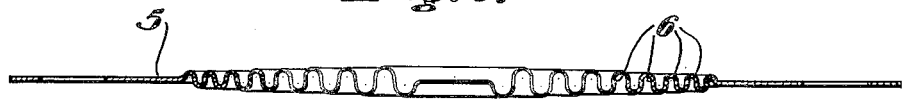

Referring more particularly to the drawings, the numerals 2 and 3 designate front and back body sections respectively, which are in the form of flat plates relieved on their inner surfaces to form a working chamber 4. A flexible metallic diaphragm 5 is clamped between the members 2 and 3 and serves to divide the working chamber 4 into two parts.

The diaphragm 5 is of special construction and is formed from spring copper or other similar metal. In forming the diaphragm a suitable blank disk is formed of uniform thickness, and a plurality of circular corrugations 6 are formed therein by spinning or otherwise working the metal. Each successive corrugation, progressing towards the center of the disk, is deeper and of slightly greater width than the preceding one, so that, due to the fact that the corrugations are formed by spinning, the metal of the diaphragm will be progressively thinner towards the center, which will cause it to bend more uniformly over its entire surface.

The fluid to be gauged is adapted to be contained in a main 8 having a restricted flow passage 9 formed by an apertured disk 10. The respective sides of the working chamber are connected through ports or openings 11 and 12 and pipes 13 and 14 with the respective sides of the restricted flow passage so that the differential pressure will act on the diaphragm 5. The ports or openings 11 and 12 are preferably formed in the lowermost portion of the chamber 4 so as to continuously drain the chamber. However, if desired, they may be located at higher points.

By having the working chamber 4 continuously filled with gas or vapor and by making the moving metal parts of light construction, the total mass of the working system is kept at a low value. By making the diaphragm 5 of a large effective area a comparatively large force is applied for even small differentials in pressure. This combination of small mass and large actuating force permits the working parts to be accelerated and moved more rapidly, so that the gauge follows a changing pressure differential instantaneously.

The diaphragm 5 has a suitable rack member 16 secured to the central portion thereof and projecting outwardly through the front body portion 2. The rack 16 is in mesh with a pinion 17 on a shaft 18 mounted in suitable bearings in a housing carried on the member 2. The shaft 18 is provided with a commutator brush 19 adapted to operatively contact with a commutator 20 which in turn is adapted to cut in and out successive banks of resistances 21. The commutator 20 and resistance banks 21 are supported on a suitable bracket 22.

The body portions 2 and 3 respectively, are drilled to form upwardly extending conduits 23 and 24 from each side of the working chamber 4, and valves 25 and 26 are provided at the upper end of the respective conduits 23 and 24. The conduits 23 and 24 may be used as vents or may be used to introduce other liquid than that being metered, such as non-condensible gases which are lighter than the fluid being gauged.

A suitable by-pass and unloading valve 28 is mounted in a by-pass conduit 29 extending between the conduits 23 and 24. The valve 28 is held against its seat by a spring 30 and by putting the proper initial compression on the spring 30 by means of the threaded stem 31, the valve can be made to automatically open at any predetermined value of the differential pressure, thus preventing the diaphragm 3 from being ruptured because of excessive pressure differentials. Valve 28 can also be forced from its seat by operation of a threaded stem 32, thus forming a by-pass for zero adjustment.

Suitable valves 33 and 34 respectively, are provided in the pipes 13 and 14 so as to permit the shutting off of the gauge when desired.

A suitable instrument board 35 containing a watt meter 36 is provided and connected electrically with the resistance banks 21, so as to integrate the flow variations.

The operation of the gauge is illustrated in the wiring diagram of Figure 4, in which the numerals 37 and 38 indicate the lines leading from a source of constant voltage current. The line 37 is connected in series with the resistance banks 21 and then through the brush 19 to one side of the watt meter, while the line 38 is connected directly to the other side of the watt meter.

It will be readily seen that any movement of the diaphragm 5 will cause a movement of the brush 19 and thereby vary the resistance in the watt meter circuit, thus indicating the variation in the fluid flow.

We claim—

1. A differential pressure gauge comprising a two piece hollow body portion, a corrugated metallic disk diaphragm mounted vertically in said body portion so as to divide said body into two separate pressure chambers, said diaphragm being secured between the parts of said body, conduits connecting each of said chambers with sources of fluid pressure, means for regulating the flow through said conduits, a horizontal rack member secured to the center of said diaphragm, a vertically disposed shaft, a pinion on said shaft and meshed with said rack, said rack being adapted to be reciprocated by said diaphragm when said diaphragm is deflected by the difference of fluid pressure in said chambers and to thereby rotate said shaft through said pinion, and electrical registering mechanism including a watt meter adapted to have a constant voltage electric circuit passed therethrough, a plurality of resistance banks, and a movable contact member for cutting said resistance banks into and out of the electric circuit passing through said meter, said contact member being actuated by said shaft.

2. A differential pressure gauge comprising a body portion composed of a pair of flat plates having their inside faces cut away to form a recess when said plates are secured together, a corrugated metallic diaphragm mounted vertically between said plates and extending parallel thereto so as to divide said recess into a pair of working pressure chambers, conduits leading from the lowest point of each of said pressure chambers to sources of fluid pressure, and upwardly extending conduit leading from the upper end of each of said pressure chambers and provided with a valved outlet, said last named conduits serving as vents when desired and having a by-pass formed therebetween, a spring pressed valve for controlling the flow through said by-pass, means for manually opening said last named valve when desired, and means operable by said diaphragm for registering the pressure changes in said chambers.

3. In a differential pressure gauge, the combination of a closed receptacle, a diaphragm dividing said receptacle into two chambers and adapted to be deflected to an extent varying with the difference between the fluid pressures in said chambers, conduits leading from said chambers to sources of fluid pressures, an upwardly extending conduit leading from the upper end of each of said chambers and provided with a valved outlet, said last named conduits serving as vents when desired and having a by-pass formed therebetween, an automatic pressure operated valve for controlling the flow through said by-pass, and means operable by said diaphragm for registering the pressure changes in said chambers.

In testimony whereof we have hereunto set our hands.

DEXTER EDGE.
JOHN A. HUNTER.